United States Patent [19]

Kinoshita

[11] Patent Number: 5,039,579
[45] Date of Patent: Aug. 13, 1991

[54] ELECTRIC POWER PRODUCING SYSTEM USING MOLTEN CARBONATE TYPE FUEL CELL

[75] Inventor: Noboru Kinoshita, Chiba, Japan

[73] Assignee: Ishikawajima-Harima Heavy Industries Co., Ltd., Tokyo, Japan

[21] Appl. No.: 649,250

[22] Filed: Jan. 31, 1991

Related U.S. Application Data

[62] Division of Ser. No. 424,134, Oct. 19, 1989.

[30] Foreign Application Priority Data

Dec. 24, 1988 [JP] Japan .................. 63-324797

[51] Int. Cl.⁵ .................................... H01M 8/04
[52] U.S. Cl. .................... 429/19; 429/16; 429/34
[58] Field of Search .......... 429/19, 34, 16, 17, 429/20, 26

[56] References Cited

U.S. PATENT DOCUMENTS

| | | | |
|---|---|---|---|
| 4,080,487 | 3/1978 | Reiser | 429/26 X |
| 4,585,708 | 4/1986 | Abens | 429/19 X |
| 4,743,516 | 5/1988 | Noguchi et al. | 429/16 |
| 4,751,151 | 6/1988 | Healy et al. | 429/17 |

Primary Examiner—Anthony Skapars
Attorney, Agent, or Firm—Trexler, Bushnell, Giangiorgi & Blackstone, Ltd.

[57] ABSTRACT

A fuel gas reformed in a reformer is fed to the anode electrode of a molten carbonate type fuel cell and is used for electrochemical reaction therein, the gas discharged from the anode electrode is introduced into a carbon dioxide separator containing an carbon dioxide absorptive liquid to remove carbon dioxide gas from the exhaust gas, the separated carbon dioxide gas is fed to the cathode electrode of the fuel cell together with air, and the exhaust gas from which carbon dioxide gas has been removed is recirculated to the anode electrode of the fuel cell via the reformer.

16 Claims, 5 Drawing Sheets

ELECTRIC POWER PRODUCING SYSTEM USING MOLTEN CARBONATE TYPE FUEL CELL

This is a divisional of copending application(s) Ser. No. 07/424,134 filed on Oct. 19, 1989.

BACKGROUND OF THE INVENTION

1. Technical Field

The present invention relates to a method of producing electric power with molten carbonate type fuel cell which directry converts chemical energy of fuel to electrical energy, and to an apparatatus for carrying out the method.

2. Background Art

A molten carbonate type fuel cell device is well known in the art. This particular fuel cell device is composed of a plurality of fuel cells stacked one after another with separators being inserted between two adjacent fuel cells. Each fuel cell comprises a tile (electrolyte plate) of a porous substance filled with an electrolyte of a molten carbonate, which tile is sandwiched between a cathode electrode (oxygen plate) and an anode electrode (fuel plate), and an oxidizing gas is fed into the cathode electrode while a fuel gas is supplied into the anode electrode so as to cause a reaction between the cathode and the anode and to produce electric power.

In a case where a hydrocarbon or methanol is employed as a fuel in the electric power-producing system using the molten carbonate type fuel cell, first the fuel gas is reformed to a fuel gas and then fed into the anode of the fuel cell.

As the means of reforming the above-mentioned fuel, an external reformation type and an internal reformation type are popular in the art.

As the conventional external reformation type, one typical system is shown in FIG. 9 of the accompanying drawings, in which a hydrocarbon (natural gas such as methane) that is used as the fuel gas to be fed into the anode b of the fuel cell a is first introduced into the reformer d, and then the hydrogen ($H_2$) and carbon monoxide (CO) formed therein are introduced into the anode b as the fuel gas and are partially consumed for producing electric power. On the other hand, the anode exhaust gas expelled from the anode b, as containing the non-reacted methane ($CH_4$), hydrogen ($H_2$) and carbon monoxide (CO) in addition to the carbon dioxide ($CO_2$) and water ($H_2O$) generated in the fuel cell 1, is supplied into the combustion chamber of the reformer d through a line e and is combusted therein to product a heat necessary for reformation of the fuel gas. The $CO_2$-containing gas exhausted from the combustion chamber of the reformer d passes through a line f to be combined with air A and is fed to the cathode c to be utilized for the cell reaction.

On the other hand, one typical system of the conventional internal reformation type is shown in FIG. 10, in which the reformer d is built in the fuel cell a so that the heat from the fuel cell a is directly utilized for the reforming reaction in the reformer d, the anode exhaust gas to be discharged from the anode b is composed of the same components as those constituting the anode exhaust gas in the case of the above-mentioned external reformation type system and contains the non-reacted $CH_4$, $H_2$ and CO. The hydrogen ($H_2$) is separated from the anode exhaust gas in a hydrogen-separator g and is recirculated to the reformer d thorugh a line h via a fuel feed line i to the reformer d while the remaining $CH_4$, CO and the non-separated $H_2$ are combusted in a catalyst combusting device j and are fed into the cathode c together with the air A through a line k (U.S. Pat. No. 4,532,192).

However, in both these external reformation type and internal reformation type systems, the non-reformed $CH_4$ contained in the gas exhausted from the anode b and CO and $H_2$ not reacted in the fuel cell are combusted and then fed into the cathode c together with the air. Therefore, these systems have a drawback that the $CH_4$, CO and $H_2$ can not be completely utilized in the cell reaction but are combusted to be converted into a heat energy. Hence, the power-producing efficiencty is poor. In addition, the methane ($CH_4$) which is not reformed in the reformer d would cause a deterioration of the power-producing efficiency. Such a deterioration has to be counterbalanced by a certain measure. For this purpose, generally an amount of the steam for reformation is increased and the reaction temperature for reformation is elevated. Still another problem is that the $H_2$ and CO not used in the fuel cell would also cause a depression of the power-producing efficiency. If the utilization factor of those gases is raised, the cell potential would drop, and therefore, a part of these $H_2$, and CO are inevitable to remain as they are not used. Moreover, there is still another problem that the non-combusted gas from the fuel cell contains carbon dioxide gas which is a low caloric gas. Therefore, an expensive catalyst combustion device is necessary for combusting the gases.

SUMMARY OF THE INVENTION

One object of the present invention is to improve the power-producing efficiency of a fuel cell, in which the anode exhaust gas as exhausted from the anode electrode of the cell is introduced into the reformer, after carbon dioxide gas has been removed from the exhaust gas, and then recirculated into the anode of the fuel cell.

Another object of the present invention is to provide a system of a fuel cell, in which the carbon dioxide gas as removed from the anode exhaust gas is fed into the cathode together with air.

According to one aspect of the present invention, there is provided a method of producing electric power with a molten carbonate type fuel cell wherein an anode gas is fed into the anode chamber of the fuel cell and a cathode gas into the cathode chamber thereof, which comprises the steps of:

separating carbon dioxide gas from the anode exhaust gas as exhausted from the anode chamber;

recirculating the anode exhaust gas, from which carbon dioxide gas has been removed in the above step, into the anode chamber as an anode gas; and feeding the carbon dioxide gas as separated from the anode exhaust gas into the cathode chanber as a cathode gas.

In accordance with the present invention, there is also provided an electrical energy producing apparatus comprising:

a plurality of molten carbonate type fuel cells, each fuel cell including a molten carbonate-containging electrolyte tile sandwiched between an anode electrode and a cathode electrode both of which electrodes being respectively provided with an anode chamber and a cathode chamber for feeding an anode gas and a cathode gas thereto;

an anode gas feed line and an anode exhaust gas line connected with the inlet and outlet of the anode chamber of the fuel cell for feeding and exhausting the anode gas thereinto and therefrom respectively;

a cathode gas feed line and a cathode exhaust line connected with the inlet and the outlet of the cathode chamber of the fuel cell for feeding and discharging the cathode gas thereinto and therefrom, respectively;

means for feeding a fuel gas and a steam into the anode gas feed line;

a reformer for reforming the fuel gas with a steam, as connected with the anode gas feed line;

a carbon dioxide gas separator for removing carbon dioxide gas from the anode exhaust gas in the anode exhaust gas line;

a circtulation line for recirculating into the reformer the anode exhaust gas from which carbon dioxide gas has been removed in the carbon dioxide gas separator; and means for feeding into the cathode gas feed line the carbon dioxide gas as separated in the carbon dioxide separator.

In this system, the carbon dioxide gas separator may have a carbon dioxide gas absorber, which includes a solution containing alkali salt or amine as a carbon dioxide gas absorptive liquid, and an absorbed liquid regenerator.

In the system, the fuel gas as reformed in the reformer is fed into the anode of the molten carbonate type fuel cell and is used for electrochemical reaction. The anode exhaust gas exhausted from the anode electrode is introduced into the carbon dioxide separator in which the carbon dioxide is separatred from the exhaust gas. The thus separated carbon dioxide gas is fed into the cathode of the fuel cell together with air, whereas the anode exhaust gas from which carbon dioxide gas has been removed is recirculated to the fuel cell via the reformer. The reformer may be either such that almost all the anode exhaust gas is introduced thereinto so as to heat the reforming part or such that the cathode exhaust gas of the fuel cell is introduced thereinto to give the heat necessary for reformation. That is, the reformer may be either such a type having no combustion chamber or a type having a combustion chamber. Furthermore, the reformer may be a type integrally provided to the fuel cell, i.e., the reformer used in the internal reformation tyep fuel cell. Provision of a shift reactor in the carbon dioxide separator in the course of the line for intoroducing the anode exhasut gas thereinto is preferred in order to facilitate the separation of carbon dioxide gas in the separator. Further, it is also preferred to provide means for combusting a part of the anode exhaust gas from the carbon dioxide separator in the cumbustion device and thereafter introducing the gas into the cathode of the fuel cell, since the temperature of the cathode may be elevated.

The anode exhaust gas discharged from the anode electrode contains carbon dioxide gas and water generated in the fuel cell, in addition to the non-used fuel, hydrogen and carbon monoxide. However, since almost all the carbon dioxide gas is separated from the exhaust gas and is fed into the cathode togther with air and since the anode exhaust gas from which carbon dioxide gas has been removed is recirctlated to the anode via the reformer, the fuel which is not used in the fuel cell can be completely and effectively consumed and therefore the power-generating efficiency is improved.

DESCRIPTION OF THE PREFERRED EMBODIMENTS

Next, preferred embodiments of the present invention will be explained with reference to the attached drawings.

Figure 1:
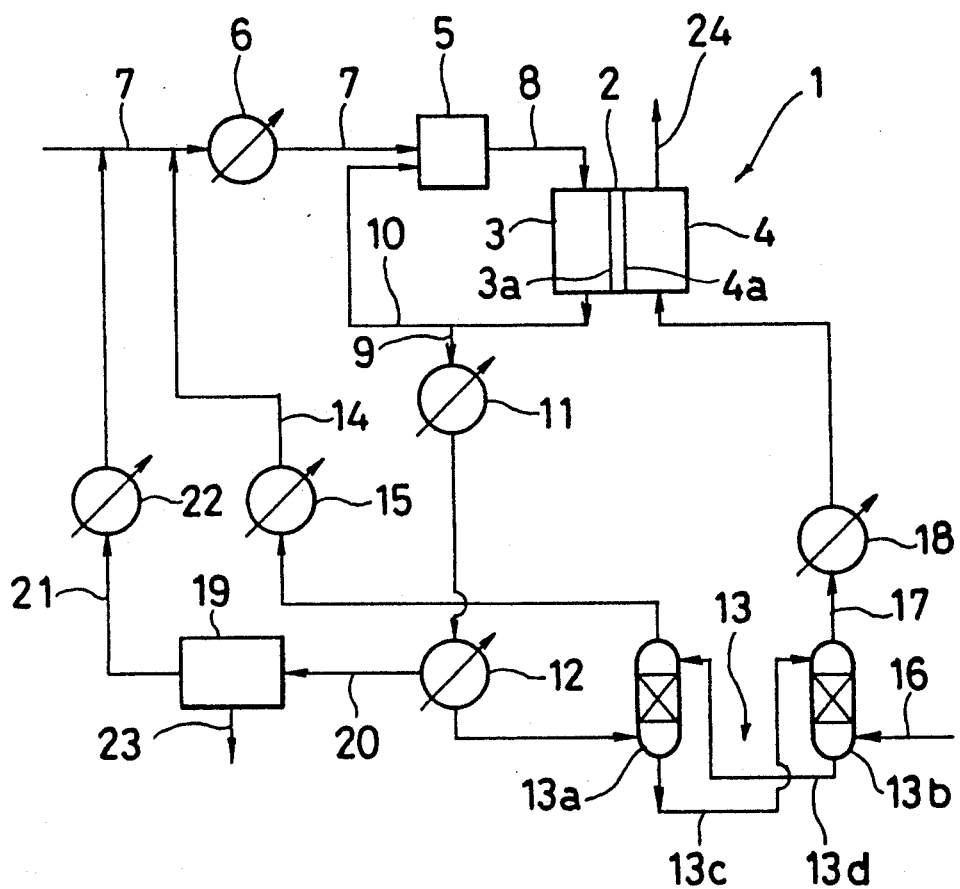
FIG. 1 is a systematic diagram showing one embodiment of the electric power-producing molten carbonate type fuel cell system of the present invention.
Figure 2:
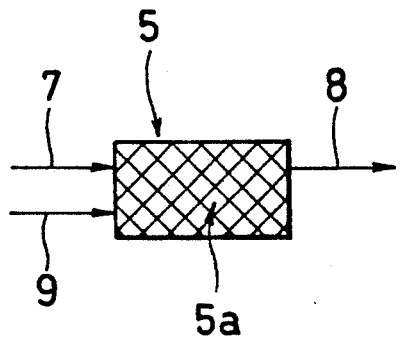
FIG. 2 is a schematic view of the reformer as used in FIG. 1.

In FIG. 1, numeral 1 designates a molten carbonate type fuel cell in which a molten carbonate-inpregnated tile 2 is sandwiched by an anode electrode 3a and a cathode electrode 4a. Both plates 3a and 4a have an anode chamber 3 and a cathode chamber 4 respectively. Numeral 5 designates a reformer in which the anode exhaust gas releases a heat necessasry for reformation and the fuel gas is thereby reformed to an anode gas. The reformer 5 is, as shown in FIG. 2, filled with reforming catalyst 5a, and the above-mentioned exhaust gas releases a heat sufficient to maintain the reforming reaction. Numeral 6 denotes a heater provided in the course of a feed line 7 for fuel gas and steam. Numeral 8 is a line for feeding the anode gas reformed in the reformer 5 to the anode chamber 3. Numeral 9 designates an anode exhaust gas line extending from the anode chamber 3. Numeral 10 is an anode exhaust gas branch line which is branched from the anode gas line 9 so as to introduce the anode exhaust gas to the inlet of reformer 5 thereby to impart the necessary heat hereto. Numeral 11 is a cooler provided downstream of the connected point of the branch line 10 with the anode exhaust gas line 9. Numeral 12 is a condenser provided in the anode exhaust gas line 9 downstream of the cooler 11. Numeral 13 is a carbon dioxide gas separator. The carbon dioxide gas separator 13 is, as one example, composed of an abosorption column 13a for absorbing carbon dioxide by a carbon dioxide gas absorber, a regeneration column 13b for regenerating the aqueous diethanolamine, an aqueous amine solution feed line 13c for feeding the aqueous diethanolamine solution to the regeneration column 13b, and an aqueous amine solution recirculating line 13d for recirculating to the absorption column 13a the aqueous diethanolamine solution as regenerated in the regeneration column 13b. The carbon dioxide gas absorber may be an aqueous diethanolamine solution, aqueous alkali salt solution such as potassium carbonate or a mixture of such solutions.

Numeral 14 is a circulation gas line for recirculating the remaining gases such as methane and hydrogen, which are taken out from the absorption column 13c after carbon dioxide gas has been removed in the carbon dioxide separator 13, to the upstream of the heater 6 as provided in the fuel and steam feed line 7. Numeral 15 is a gas heater as provided in the course of the circulation gas line 14. Numeral 16 is an air feed duct as connected to the bottom of the regeneration column 13b of the carbon dioxide gas separator 13. Numeral 17 is an air feed line for taking out from the regeneration column 13b the carbon dioxide gas-containing air as separated in carbon dioxide gas separator 13 and feeding the same to the cathode chamber 4 of the fuel cell 1. Numeral 18 is an air heater as provided in the course of the carbon dioxide gas feed line 17. Numeral 19 is a water-treating boiler. Numeral 20 is a line for conveying the water from the condenser 12 to the water-treating boiler 19. Numeral 21 is a steam feed line for conveying the steam as separated in the water-treating boiler 19 and over-heated in a heater to an over-heated steam to an upper stream part of the fuel feed line 7. Numeral 23 is an exhaust line for discharging any excessive water out of the system. Numeral 24 is a cathode exhaust gas line for the gas exhausted from the cathode chamber 4 of the fuel cell 1.

In one example to discribed hereunder, methane is employed as the hydrocarbon or alcohol-containing fuel gas to be fed into the fuel feed line 7. Methane is pre-heated in the heater 6 and then reformed in the reformer 5 to give hydrogen gas. Carbon monoxide gas and methane in the reformer 5 is obtained from the gas as exhausted from the anode chamber 3 in this example. The anode gas reformed in the reformer 5 is introduced into the anode chamber 3 of the fuel cell 1 via the feed line 8 and is utilized for electro-chemical reaction therein. The gas to be exhuasted from the anode chamber 3 contains carbon dioxide gas ($CO_2$) and water ($H_2O$) which are generated in the fuel cell, in addition to the non-used methane ($CH_4$), hydrogen ($H_2$) and carbon monoxide (CO). Most of these gases are transported to the reformer 5 via the anode exhaust gas branch line 10 branched from the anode exhaust gas line 9 while a part of the same is led to the cooler 11 and the condenser 12 via the anode exhaust gas line 9 whereupon the gas fraction is introduced into the absorber 13a of the carbon dioxide gas separator 13. Most of the carbon dioxide gas among the gas fraction transmitted into the absorber 13a is absorbed in the aqueous diethanolamine solution as being brought into contact therewith in the absorber 13a and is thereby removed, while the gases remaining after separation of the carbon dioxide gas which contain methane, a trace amount of carbone dioxide and hydrogen are taken out from the top of the absorber 13a through the residual gas line 14, pre-heated in the circulation gas heater 15, transported to the upper stream of the heater 6, reformed to an anode gas in the reformer 5 and thereafter transported to the anode chamber 3 of the fuel cell 1 in which the gas undergoes the cell reaction. Accordingly, the electric power producing efficiency is raised. The aqueous amine solution which has absorbed the carbon dioxide gas in the absorption column 13a is fed to the regeneration column 13b via the aqueous amine solution feed lien 13c, in which the carbon dioxide gas is stripped with the air supplied from the air feed duct 16 and the aqueous amine solution from which the carbone dioxide gas has been removed is recirculated to the absorption column 13a via the aqueous amine solution rcirculation line 13d and is used therein for absorbing carbon dioxide gas. The air which has contained carbon dioxide gas in the regeneration column 13b is preheated in the air preheater 18 and then supplied into the cathode chamber 4 of the fuel cell 1, in which the oxygen gas and carbon dioxide gas are utilized for electrochemical reaction.

The water separated in the condenser 12 is transported to the water-treating boiler 19 via the line 20 whereas the steam is heated to a steam by the heater 22 in the steam feed line 21 and introduced into the fuel feed line 7 to be utilized in the reformer 5 as a reforming steam. The excessive water in the water treating boiler 19 is expelled out of the system via the discharge line 23.

In accordance with the present invention, as mentioned above, since the non-used methane and hydrogen contained in the anode exhaust gas taken out through the anod exhaust gas line 9 are recovered by the carbon dioxide gas separator 13 and is recirculated into the fuel cell 1 via the reformer 5 to be utilized for the electrochemical reaction therein, the power producing efficiency may be noticeably improved as compared with the conventional system in which the non-used gases are effectively not utilized in the cell reaction but are merely combusted. In this case, it is satisfactory that the methane-reforming efficiency in the reformer 5 be low since the methane can be recycled. Accordingly, the heat from the cell may be easily utilized as the heat necessary for the reformation reaction.

Figure 3:
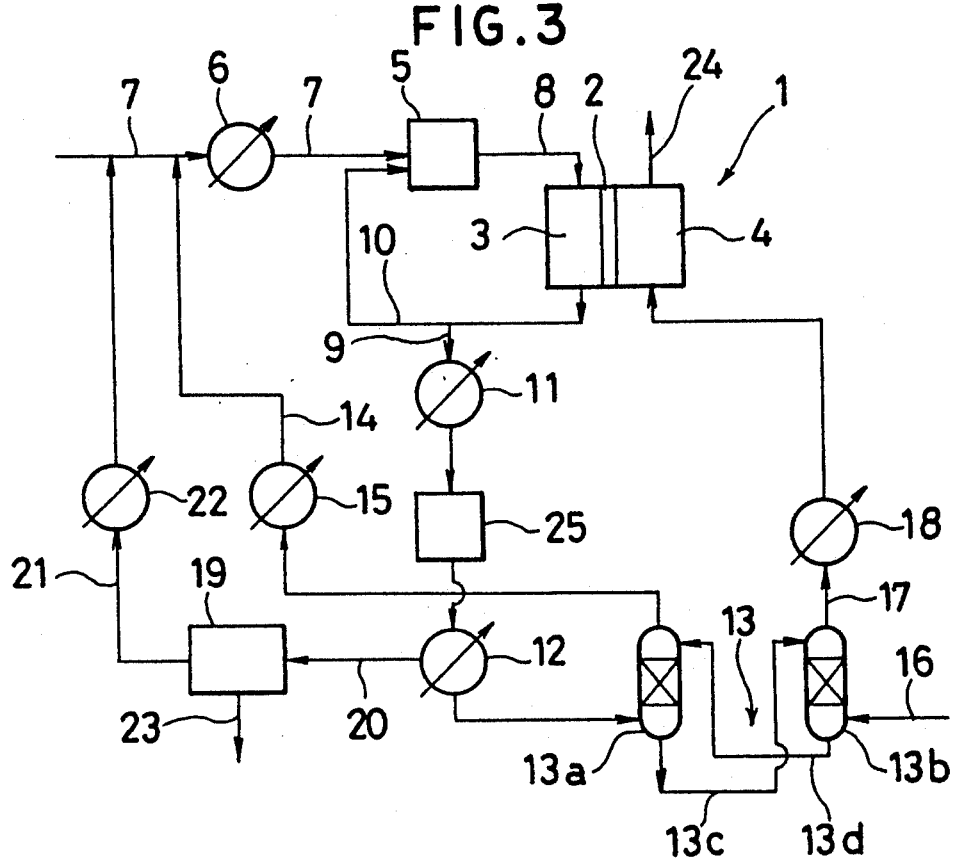
FIG. 3 and FIG. 4 are system diagrams of other embodiments according to the present invention respectively.

FIG. 3 shows another embodiment of the present invention. In this particular embodiment, a shift reactor 25 is provided between the cooler 11 and the condenser 12. The other constitution is substantially same as that of FIG. 1.

The anode exhaust gas expelled through the anode exhaust gas line 9 contains, as mentioned above, $H_2$, CO, $CO_2$ and $H_2O$. CO and $H_2O$ among these gases are shift-reacted to $H_2$ and $CO_2$ in the shift reactor 25, while $CO_2$ is separated in the carbon dioxide gas separator 13 and $H_2$ is recirculated to the anode chamber 3 via the reformer 5 in the system of FIG. 3. Accordingly, the removal of the carbon dioxide gas is easily done, and the partial pressure of CO is lowered in the recirculation line.

Figure 4:
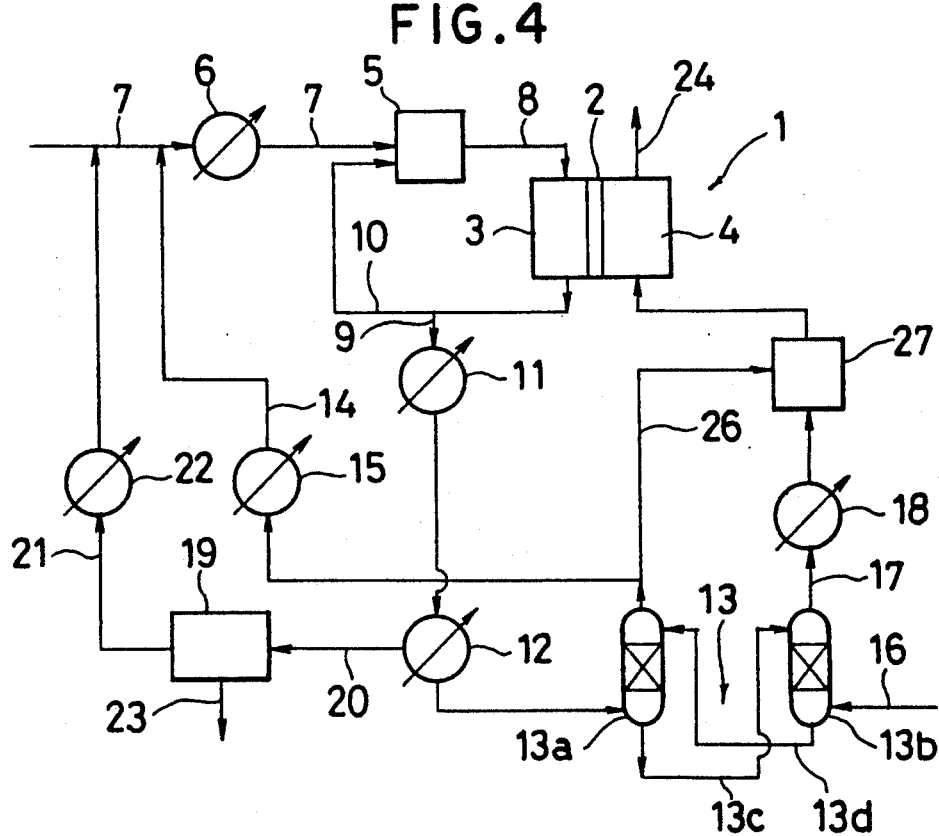

FIG. 4 shows still another embodiment of the present invention. A part of the residual gases taken out from the absorption column 13a, which include methane and hydrogen, is branched from the residual gas branch line 26, and introduced into and burned in the combustion device 27 provided in the course of the air feed line 17. The resulting combustion gas is transported into the cathode chamber 4. This embodiment has various advantages that the temperature of the cathode gas is elevated and the power-producing efficiency is thereby improved, and accumulation of trace components which would be caused by circulation of the anode gas for a long period of time is prevented.

The system illustrated in FIG. 4 is such that the exahust gas from the anode chamber 3 is circulated to the reformer 5 via the anone exhaust gas branch line 10 extending from the anode exhaust gas line 9, in which the heat from the anode exhaust gas is utilized for the reformation reaction. According to the experiments by the present inventor where the flow amount of the gas to be circulated to the reformer 5 via the anode exhaust gas branch line 10 was made three times as much as that of the gas to be transported to the carbon dioxide gas separator 13 through the anode exhaust gas line 9, and the anode outlet temperature was 700 degrees C. (°C.) and the temperature in the fuel feed line 7 was 550° C., the outlet temperature of the reformer 5 was 607° C. and the reformed percentage of methane was 25.7%. Accordingly, even though the reformed percentage of methane is small, the power-producing efficiency is high in the method of the present invention since all the non-reformed methane is recirculated to the reformer and is utilized for the cell reaction.

Only the carbon dioxide gas is removed from the gases introduced into the carbon dioxide gas separator 13 through the anode exhaust gas line 9. Here, when an aqueous 30 wt. % diethanolamine solution is employed as a solution for absorbing the carbon dioxide gas, 85.8% of the carbon dioxide gas in the anode exhaust gas may be absorbed or removed in the absorption column 13a. The remaining gases thus separated include methane, hydrogen, carbon monoxide, carbon dioxide and water and those gases are entirely recirculated to the reformer 5. Therefore, there is no fuel loss. When an air which corresponds to the oxygen utilization percentage of 50% is utilized as the stripping gas in the regenerator column 13b, all the carbon dioxide gas absorbed in the absorption column 13a can be stripped and transported to the cathode 4 together with air. Accordingly, any additional heat, for example by steam, is unnecessary for regeneration.

Next, the 200 KW-grade power-producing fuel cell system which is driven under normal pressure and which has the constitution shown in FIG. 1 was compared with the conventional external reformation type fuel cell, and the results are as shown in the Table below.

|  | Conventional External Reformation Type Fuel Cell | System of the Invention of FIG. 1 |
| --- | --- | --- |
| Current Density of Cell (mA/cm$^2$) | 150 | 150 |
| Volate (mV/cell) | 712 | 750 |
| Number of cells | 323 | 307 |
| Power Producing Capacity (kW) | 230 | 230 |
| Amount of Metane Used (kg*mol/hour) | 1.91 | 1.50 |

As is obvious from the data shown in this Table, the power-producing efficiency of the system of the present invention in comparison with the conventional system is 1.91/1.5=1.27, i.e., 27% higher than that of the conventional power generation system.

Figure 5:
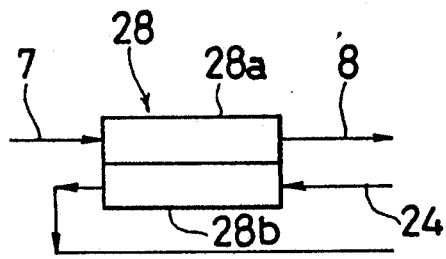
FIG. 5, FIG. 6 and FIG. 7 are outline views to show other types of the reformer applicable to the present invention respectively.
Figure 6:
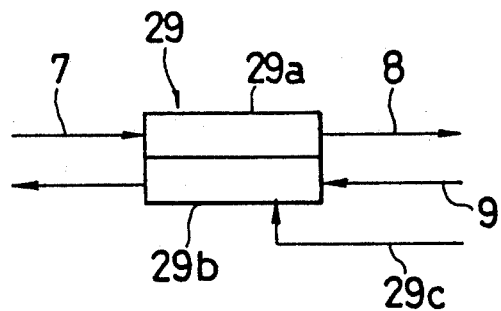
Figure 7:
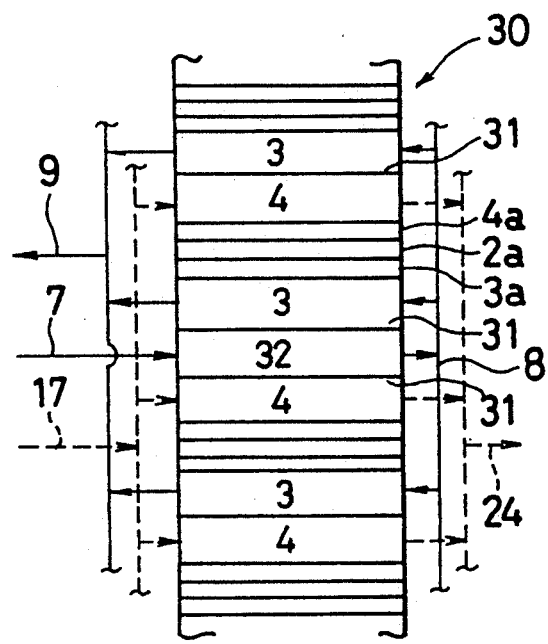

FIGS. 5 through 7 show still other embodiments of the reformer of the present invention.

FIG. 5 shows a modified reformer 28, and the cathode exhaust gas from the line 24 is introduced into the heating part 28b of the reformer 28 in order that the heat necessary for reformation in the reforming part 28a may be obtained from the gas as taken out from the cathode chamber 4, whereas the gas which has given the heat to the reformation reaction is then transported to the cathode chamber.

FIG. 6 shows another reformer 29. In this case, the heat necessary for reformation in the reforming part 29a of the reformer 29 is obtained from a combustion in the combustion part 29b, and for this, a part of the anode exhaust gas is introduced into the combustion part 29b as a combustion gas while a part of the air to be supplied to the cathode is introduced into the combustion part 29b via the line 29c, whereupon the gas which has given the heat for the reformation reaction is then fed into the cathode.

FIG. 7 shows the internal reformation type fuel cell 30, in which the electrolyte tile 2 is sandwiched between the anode electrode 3a and the cathode electrode 4a, a plurality of anode/tile/cathode units are stacked via separator plates 31 with the reformer 32 being inserted in an arbitrary separator plate 31. Each separator plate 31 defines the anode chamber 3 on one face thereof and the cathode chamber 4 on the other face thereof. The anode gas reformed in the reformer 32 is supplied into the anode chambers 3 through the line 8 formed inside the fuel cell, and the anode exhaust gas from the respective chambers 3 are collected and discharged through the exhaust gas line 9. The cathode gas coming from the line 17 is distributed into the respective cathode chambers 4 and then flows into the line 24.

Figure 8:
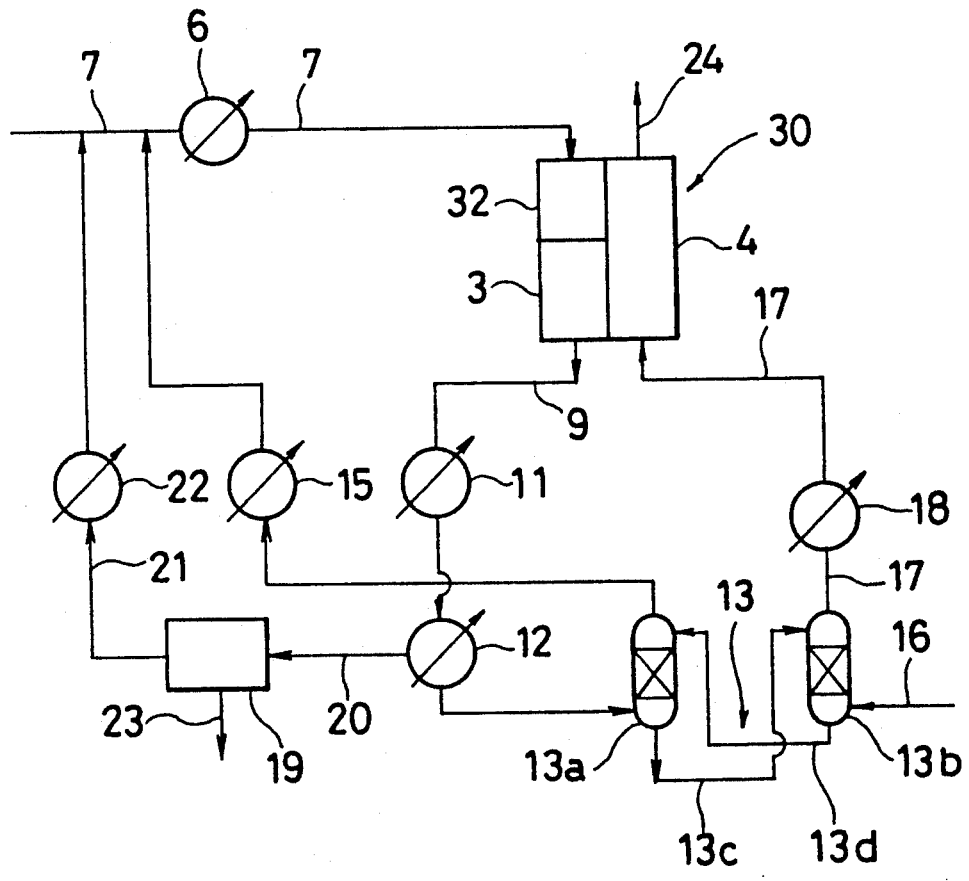
FIG. 8 is a system diagram illustrating one embodiment of the electric power-producing molten carbonate type fuel cell device of the present invention, which employs the reformer shown in FIG. 7.
Figure 9:
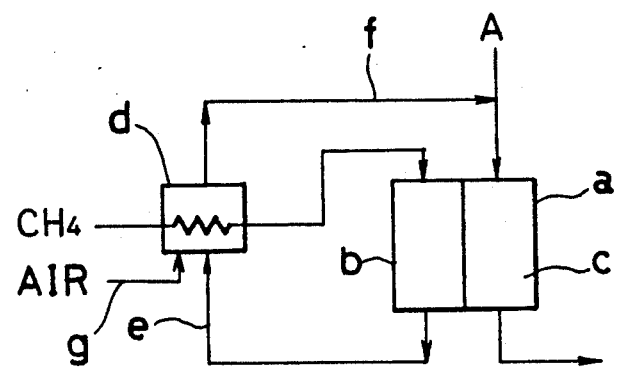
FIG. 9 is a schematic diagram showing a conventional external reformation type electric power-producing fuel cell system.

In the internal reformation type fuel cell 30, the reformation reaction temperature is maintained by the heat derived from the anode gas in the anode chamber 3 contacting the reformer 32 and the heat derived from the cathode gas in the cathode chamber 4 which also contacts the reformer 32. FIG. 8 shows an electric power-producing apparatus which employs the internal reformation type fuel cell 30 of FIG. 7. The power-generation apparatus of FIG. 8 is same as that of FIG. 1, except that the reformer is located in the fuel cell in FIG. 8.

Figure 10:
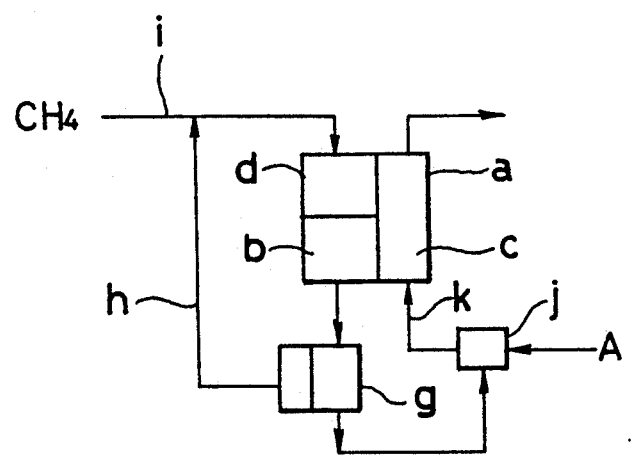
FIG. 10 is a schematic diagram showing a conventional internal reformation type electric power-producing fuel cell system.

In the case of the conventional internal reformation type reformer as shown in FIG. 10, it is necessary that the reforming part is directly provided inside the anode chamber, since the efficiency for reformation of methane has to be raised. This means that the conventional type reformer has a drawback that the reforming catalyst is likely deteriorated by the electrolyte. On the contrary, since the efficiency for reformation of methane is not an important factor in the system of the present invention, the reforming part 30a and the anode chamber 30b can be provided separately, as shown in FIG. 8, and heat exchange may be effected indirectuly therebetween. Therefore, the longevity of the reforming catalyst is prolonged.

The reformer shown in FIGS. 5 or 6 may be employed in place of the reformer 5 of FIG. 1. In addition, various aqueous solutions of other amines or alkali metal salts or mixtures thereof may be employed as the carbon dioxide gas-absorbing solution, in place of the aqueous diethanolamine (DEA) solution.

As mentioned above, the anode exhaust gas exhausted from the anode of the fuel cell is transported to the carbon dioxide gas separator and the carbon dioxide is separated from the exhaust gas. The residual gas not containing carbon dioxide gas is then fed into the anode of the fuel cell via the reformer, whereas the carbon dioxide gas is supplied into the cathode of the fuel cell together with air. Accordingly, the fuel not used in the fuel cell may be efficiently recirculated and completely utilized for the cell reaction so that the power-producing efficiency is improved. In addition, when methane is used as a fuel, the carbon dioxide gas in the anode outlet gas may be separated and all the methane may be resirculated to the reformer. This means that the fuel utilization efficiency does not drop even though the methane reformation is low. Accordingly, a design of the reformer can be simplified. Moreover, the cathode inlet temperature may be raised due to combustion by a burner so as to further improve the fuel cell characteristics. In this case, the anode exhaust gas containing less amount of carbon dioxide is obtained so that an expensive catalyst combustion device is unnecessary.

I claim:

1. An apparatus for producing electric power comprising:
   at least one molten carbonate type fuel cell, the fuel cell including a molten carbonate-impregnated electrolyte tile sandwiched between an anode electrode and a cathode electrode both of which electrodes being provided with an anode chamber and a cathode chamber for feeding an anode gas and a cathode gas thereto, respectively;
   an anode gas feed line and an anode exhaust gas line connected with an inlet and an outlet of the anode chamber of the fuel cell for introducing and exhausting the anode gas thereinto and therefrom, respectively;
   a cathode gas feed line and a cathode exhaust line connected with an inlet and an outlet of the cathode chamber of the fuel cell for introducing and exhausting the cathode gas thereinto and therefrom, respectively;
   means for feeding a fuel gas and a steam into the anode gas feed line;
   a reformer for reforming the fuel gas with a steam, as connected with the anode gas feed line;
   a carbon dioxide gas separator for removing carbon dioxide gas from the anode exhaust gas in the anode exhaust gas line;
   a circulation line for recirculating into the reformer the anode exhaust gas from which carbon dioxide gas has been removed in the carbon dioxide gas separator; and
   means for feeding the carbon dioxide gas separated in the carbon dioxide gas separator into the cathode gas feed line.

2. The apparatus as claimed in claim 11, wherein the carbon dioxide gas separator includes an absorption column in which the anode exhaust gas is introduced from the anode exhaust gas line for conducting a vapour-liquid contact of the anode exhaust gas with a carbon dioxide-absorbing liquid and the thus contact-treated gas is discharged to a circulation line, and a regeneration column connected with the cathode gas feed line in which the carbon dioxide-absorbed liquid from the absorption column is introduced and the liquid is stripped with air fed from the cathode gas feed line so as to release carbon dioxide gas from the liquid while the carbon dioxide gas-containing air is fed to the cathode chamber and the liquid from which the carbon dioxide gas has been stripped and released is recirculated to the said absorption column.

3. The apparatus as claimed in claim 2, wherein the anode exhaust gas line extending from the anode chamber to the absorption column is connected with condensing and separating means for isolating the steam from the anode exhaust gas.

4. The apparatus as claimed in claim 2, wherein the condensing and separating means is connected with a steam feed line through which the steam converted from a part of the condensed and separated water by a heater is recirculated to an upper stream part of the anode gas feed line.

5. The apparatus as claimed in claim 1, wherein the anode exhaust gas or cathode exhaust gas is introduced into the reformer as the heat source for maintaining the reforming temperature.

6. An apparatus for producing electric power comprising:
   at least one molten carbonate type fuel cell including a molten carbonate-impregnated electrolyte tile sandwiched between an anode electrode and a cathode electrode both of which electrodes being provided with an anode chamber and a cathode chamber for feeding an anode gas and a cathode gas thereto, respectively;
   an anode gas feed line and an anode exhaust gas line as connected with an inlet and an outlet of the anode chamber of the fuel cell for introducing and exhausting the anode gas thereinto and therefrom, respectively;
   a cathode gas feed line and a cathode exhaust line as connected with an inlet and an outlet of the cathode chamber of the fuel cell for introducing and exhausting the cathode gas thereinto and therefrom respectively;
   means for feeding a fuel gas and a steam into the anode gas feed line;
   a reformer for reforming the fuel gas with a steam, as connected with the anode gas feed line;
   a shift reactor connected with the anode exhaust gas line for shifting the carbon monoxide gas and steam in the anode exhaust gas to carbon dioxide gas and hydrogen; and
   a carbon dioxide gas separator including
      an absorption column in which the anode exhaust gas from the said shift reactor is brought into contact with a carbon dioxide-absorbing liquid by vapour-liquid contact and the thus contacted gas is recirculated to the said reformer, and
      a regeneration column connected with the cathode gas feed line in which the carbon dioxide-absorbed liquid from the absorption column is introduced and the liquid is stripped with air as being fed from the cathode gas feed line so as to release carbon dioxide gas from the liquid while the carbon dioxide gas-containing air is fed to the cathode chamber and the liquid from which the carbon dioxide gas has been stripped and released is recirculated to the said absorption column.

7. The apparatus as claimed in claim 6, wherein the anode exhaust gas line from the anode chamber to the absorption column is connected with condensing and separating means for isolating the steam from the anode exhaust gas.

8. The apparatus as claimed in claim 7, wherein the condensing and separating means is connected with a steam feed line through which the steam as converted from a part of the condensed and separated water by a heater is resirculated to an upper stream part of the anode gas feed line.

9. The apparatus as claimed in claim 6, wherein the anode exhaust gas or cathode exhaust gas in introduced into the reformer as the heat source for maintaining the reforming temperature.

10. An apparatus for producing electric power comprising:
    at least one molten carbonate type fuel cell including a molten carbonate-impregnated electrolyte tile as sandwiched between an anode electrode and a cathode electrode both of which are provided with an anode chamber and a cathode chamber for feeding an anode gas and a cathode gas thereto, respectively;

an anode gas feed line and an anode exhaust gas line as connected with an inlet and an outlet of the anode chamber of the fuel cell for introducing and exhausting the anode gas thereinto and therefrom, respectively;

a cathode gas feed line and a cathode exhaust line as connected with an inlet and an outlet of the cathode chamber of the fuel cell for introducing and exhausting the cathode gas thereinto and therefrom, respectively;

means for feeding a fuel gas and a steam into the anode gas feed line;

a reformer for reforming the fuel gas with a steam, as connected with the anode gas feed line;

a carbon dioxide gas separator including an absorption column in which the anode exhaust gas from the anode exhaust gas line is brought into contact with a carbon dioxide-absorbing liquid by vapour-liquid contact and the thus contacted gas is recirculated to the said reformer, and a regeneration column connected with the cathode gas feed line in which the carbon dioxide-absorbed liquid from the said absorption column is introduced and the liquid is tripped with air as being fed from the cathode gas feed line so as to release carbon dioxide gas from the liquid while the liquid from which the carbon dioxide gas has been stripped and released is recirculated to the said absorption column; and a combustion device connected with the cathode gas feed line between the regeneration column of the carbon dioxide gas separator and the cathode chamber in which combustion device a part of the anode exhaust gas coming from the said absorption column to the reformer is introduced and is combusted with the air taken from the cathode gas feed line, so as to produce a cathode gas.

11. The apparatus as claimed in claim 10, wherein the anode exhaust gas line extending from the anode chamber to the absorption column is connected with condensing and separating menas for isolating the steam from the anode exhaust gas.

12. The apparatus as claimed in claim 11, wherein the condensing and separating means is connected with a steam feed line through which the steam as converted from a part of the condensed and separated water by a heater is recirculated to an upper steram part of the anode gas feed line.

13. The apparatus as claimed in claim 10, wherein the anode exhaust gas or cathode exhaust gas is intoroduced into the reformer as the heat source for maintaining the reforming temperature.

14. An apparatus for producing electric power comprising:

a stack of internal reformation type molten carbonate fuel cells, each fuel cell including a molten carbonate-impregnated electrolyte tile which is sandwiched by an anode electrode and a cathode electrode both of which electrodes being provided with an anode chamber and a cathode chamber for feeding an anode gas and a cathode gas thereinto, respectively;

a reformer provided between an arbitrary pair of anode chamber and cathode chamber for feeding a reformed gas into the anode chamber;

a fuel gas and steam feed line for feeding a fuel gas and a steam into the reformer;

an anode gas exhausting line connected with an outlet of the anode chamber for expelling the anode gas;

a cathode gas feed line and a cathode exhaust gas line connected with an inlet and an outlet of the cathode chamber of the fule cell respectively for introducing and discharging the cathode gas; and a carbon dioxide gas separator which comprises an absorption column in which the anode exhaust gas from the anode exhaust gas line is brought into contact with a carbon dioxide-absorbing liquid by vapour-liquid contact and the thus contacted gas is recirculated into the fuel gas and steam feed line and a regeneration column connected with the cathode gas feed line in which the carbon dioxide-absorbed liquid from the said absorption column is introduced and the liquid is stripped with air fed from the cathode gas feed line so as to release carbon dioxide gas from the liquid while the carbon dioxide gas-containing air is fed into the cathode chamber and the liquid from which the carbon dioxide gas has been stripped and released is recirculated to the said absorption column.

15. The apparatus as claimed in claim 14, wherein condensing and separating means for removing steam from the anode exhaust gas is connected with the anode exhaust gas line as running from the anode chamber to the absorption column.

16. The apparatus as claimed in claim 15, wherein the condensing and separating means is connected with a steam feed line through which the steam as converted from a part of the condensed and separated water by a heater is recirculated to the fuel gas and steam feed line.

* * * * *

UNITED STATES PATENT AND TRADEMARK OFFICE
CERTIFICATE OF CORRECTION

PATENT NO. : 5,039,579
DATED : August 13, 1991
INVENTOR(S) : Noboru Kinoshita It is certified that error appears in the above-identified patent and that said Letters Patent is hereby corrected as shown below:

Column 9, Line 40 " The apparatus as claimed in claim 11, " it should read -- The apparatus as claimed in claim 1, --

Signed and Sealed this

Ninth Day of February, 1993

*Attest:*

STEPHEN G. KUNIN

*Attesting Officer*     Acting Commissioner of Patents and Trademarks